(12) United States Patent
Li et al.

(10) Patent No.: US 12,371,356 B1
(45) Date of Patent: Jul. 29, 2025

(54) DEVICE AND METHOD FOR TREATING NITROGEN AND PHOSPHORUS POLLUTANTS IN MARICULTURE WASTEWATER

(71) Applicant: OCEAN UNIVERSITY OF CHINA, Shandong (CN)

(72) Inventors: Meng Li, Shandong (CN); Yuanrong Wei, Shandong (CN); Xiefa Song, Shandong (CN); Min Zhang, Shandong (CN)

(73) Assignee: OCEAN UNIVERSITY OF CHINA, Qingdao (CN)

( * ) Notice: Subject to any disclaimer, the term of this patent is extended or adjusted under 35 U.S.C. 154(b) by 0 days.

(21) Appl. No.: 19/019,450

(22) Filed: Jan. 13, 2025

(30) Foreign Application Priority Data

Jul. 15, 2024 (CN) .......................... 202410939252.4

(51) Int. Cl.
| | |
|---|---|
| *C02F 3/34* | (2023.01) |
| *C02F 1/28* | (2023.01) |
| *C02F 101/10* | (2006.01) |
| *C02F 101/16* | (2006.01) |
| *C02F 103/08* | (2006.01) |
| *C02F 103/20* | (2006.01) |

(52) U.S. Cl.
CPC .............. *C02F 3/345* (2013.01); *C02F 1/283* (2013.01); *C02F 2101/101* (2013.01); *C02F 2101/105* (2013.01); *C02F 2101/163* (2013.01); *C02F 2103/08* (2013.01); *C02F 2103/20* (2013.01); *C02F 2305/06* (2013.01)

(58) Field of Classification Search
CPC ................................ C02F 3/345; C02F 1/283
See application file for complete search history.

(56) References Cited

FOREIGN PATENT DOCUMENTS

| CN | 115259545 A | 11/2022 | |
|---|---|---|---|
| CN | 116715357 A | 9/2023 | |
| CN | 116903153 A | 10/2023 | |
| EP | 2508483 A1 * | 10/2012 | ........... B01D 21/003 |
| JP | 2002273475 A * | 9/2002 | |
| JP | 2021079322 A * | 5/2021 | |

OTHER PUBLICATIONS

Machine tanslation of JP2002273475 (Year: 2025).*
Machine tanslation of JP2021079322 (Year: 2025).*

* cited by examiner

*Primary Examiner* — Chester T Barry

(57) ABSTRACT

Disclosed is a device and method for efficiently treating nitrogen and phosphorus pollutants in mariculture wastewater, falling within the technical field of mariculture tailwater treatment. According to the method, in a nitrogen removal functional zone, modified agricultural waste is combined with elemental sulfur particles, and sulfur-reducing bacteria utilize carbon sources slowly released from the waste to reduce elemental sulfur to $S^{2-}$ or $S_n^{2-}$ utilized by sulfur-oxidizing bacteria, achieving sulfur transformation. The present disclosure solves the problems that, during treating mariculture tailwater using sulfur autotrophic denitrification technology, the low solubility of elemental sulfur particles and high dissolved oxygen concentration in the tailwater result in low utilization rate of elemental sulfur and poor nitrogen and phosphorus removal efficiency.

12 Claims, 3 Drawing Sheets

DEVICE AND METHOD FOR TREATING NITROGEN AND PHOSPHORUS POLLUTANTS IN MARICULTURE WASTEWATER

CROSS-REFERENCE TO RELATED APPLICATION

This application claims priority of Chinese Patent Application No. 202410939252.4, filed on Jul. 15, 2024, the entire contents of which are incorporated herein by reference.

TECHNICAL FIELD

The present disclosure belongs to the technical field of mariculture tailwater treatment, and in particular to a device and method for efficiently treating nitrogen and phosphorus pollutants in mariculture wastewater.

BACKGROUND

The discharge standards for coastal mariculture tailwater are typically as follows. Primary standard requires the limit for total nitrogen concentration to be 3.0 mg/L and the limit for total phosphorus concentration to be 0.5 mg/L. Secondary standard requires the limit for total nitrogen concentration to be 5.0 mg/L and the limit for total phosphorus concentration to be 1.0 mg/L. The limits for nitrogen and phosphorus concentrations are crucial factors for the standard discharge of mariculture tailwater.

The mariculture tailwater features high salinity, high ion concentration, low C/N, and fluctuating nitrogen concentrations due to factors such as feeding times, limiting the efficiency of biological nitrogen and phosphorus removal. Featuring low cost and high efficiency, biological nitrogen removal is the primary nitrogen removal method for mariculture tailwater, but carbon source is required to enhance the nitrogen removal efficiency. Conventional carbon sources such as sodium acetate, glucose, and methanol can effectively improve nitrogen removal efficiency, but fluctuations in nitrogen concentration in the tailwater can lead to insufficient nitrogen removal efficiency or secondary pollution, and easily generate toxic sulfides especially in the presence of high sulfate concentrations in mariculture tailwater. Using solid degradable polymers as carbon sources can improve nitrogen removal efficiency in mariculture tailwater, but the cost is high. Taking polycaprolactone as an example, it can cost tens of thousands of yuan per ton. Using elemental sulfur particles as solid electron donors achieves nitrogen removal through sulfur autotrophic denitrification, achieving on-demand electron supply, and has been widely applied in nitrogen removal from low C/N wastewater. However, when used for nitrogen removal from mariculture tailwater, the low solubility of elemental sulfur particles results in slow growth of sulfur biofilms, and the high dissolved oxygen concentration in the tailwater leads to low utilization of elemental sulfur, limiting the application of sulfur autotrophic denitrification in mariculture tailwater. Additionally, the sulfur autotrophic denitrification process has little effect on total phosphorus removal, further limiting the application of sulfur autotrophic denitrification technology in mariculture tailwater.

According to the above analysis, the prior art has the following problems and deficiencies. During treating mariculture tailwater using sulfur autotrophic denitrification technology, the low solubility of elemental sulfur particles and the high dissolved oxygen concentration in the tailwater result in low utilization of elemental sulfur and poor nitrogen and phosphorus removal efficiency.

SUMMARY

To overcome the problem existing in the related art, examples of the present disclosure provide a device and method for efficiently treating nitrogen and phosphorus pollutants in mariculture wastewater, specifically relating to a method and device for treating mariculture tailwater based on sulfur transformation and electron allocation.

The technical solutions are as follows. A device for efficiently treating nitrogen and phosphorus pollutants in mariculture wastewater includes an inner cavity and an outer cavity.

The inner cavity includes an influent water distribution zone and a nitrogen removal functional zone based on efficient sulfur autotrophic denitrification through sulfur transformation. The influent water distribution zone and the nitrogen removal functional zone are separated into upper and lower parts by a perforated partition plate.

The outer cavity includes a secondarily modified biochar zone and an effluent water microporous aeration zone, arranged on two sides of the nitrogen removal functional zone, respectively.

The nitrogen removal functional zone includes elemental sulfur particles, modified agricultural waste, and enriched sulfur-reducing bacteria and sulfur-oxidizing bacteria. The sulfur-reducing bacteria utilize carbon sources slowly released from the modified agricultural waste to reduce the elemental sulfur particles into sulfide $S^{2-}$/polysulfide $S_n^{2-}$ with bioaffinity, and the sulfur-oxidizing bacteria reduce nitrate into nitrogen gas while utilizing the sulfide $S^{2-}$ and the polysulfide $S_n^{2-}$ for sulfur oxidation, achieving nitrogen removal.

Further, the influent water distribution zone is arranged with smooth filler materials formed by cone-shaped pebbles and gravel, for uniformly dispersing mariculture tailwater.

Further, a particle size of the pebbles and gravel is 5 cm-8 cm.

Further, a bottom of the influent water distribution zone is connected to a water inlet pipe, and a sewage outlet is mounted on the other side of the water inlet pipe.

Further, the secondarily modified biochar zone is filled with secondarily modified biochar having high sulfide and phosphorus adsorption capability. The secondarily modified biochar is prepared by pyrolyzing alkali-modified agricultural waste at a temperature of 250° C.-550° C. to produce biochar, followed by secondary modification of the biochar with $Fe^{3+}$ and $Al^{3+}$.

Further, the effluent water microporous aeration zone is arranged with a microporous aeration disk at a water outlet, for removing sulfide and ammonia nitrogen byproducts present in tailwater after undergoing a nitrogen and phosphorus removal functional zone, minimizing the byproducts produced during mariculture tailwater treatment. The microporous aeration disk is connected to an air pump.

Further, the secondarily modified biochar zone is connected to a water inlet.

Another objective of the present disclosure is to provide a method for efficiently treating nitrogen and phosphorus pollutants in mariculture wastewater, applied to the device for efficiently treating nitrogen and phosphorus pollutants in mariculture wastewater, including the following content.

In the nitrogen removal functional zone, the modified agricultural waste is combined with the elemental sulfur particles, and the sulfur-reducing bacteria utilize the carbon sources slowly released from the waste to reduce elemental sulfur to $S^{2-}$ or $S_n^{2-}$ utilized by the sulfur-oxidizing bacteria, achieving sulfur transformation. At the same time, the sulfur-oxidizing bacteria convert nitrate into nitrogen gas, achieving nitrogen removal.

In the secondary modified biochar zone, biochar is secondarily modified to produce secondarily modified biochar with high sulfide and phosphorus adsorption characteristics under seawater conditions, and aeration in the effluent water microporous aeration zone is utilized to promote adsorption of sulfide and nitrification of ammonia nitrogen.

Further, during phosphorus removal using the secondarily modified biochar, in a case that a phosphate concentration in the mariculture tailwater fluctuates from 1-10 mg/L, with a hydraulic retention time (HRT) of 3-24 h, an effluent phosphate concentration is 0 mg/L.

Further, in the nitrogen removal functional zone, in a case that a total nitrogen concentration in the mariculture tailwater fluctuates from 10-40 mg/L, with an HRT of 3-24 h, sulfur autotrophic denitrification is carried out through the sulfur transformation process, reducing an effluent concentration to 0-6.5 mg/L.

Combining all the above technical solutions, the present disclosure achieves the following beneficial effects. The present disclosure solves the problems that, during treating mariculture tailwater using sulfur autotrophic denitrification technology, the low solubility of elemental sulfur particles and high dissolved oxygen concentration in the tailwater result in low utilization rate of elemental sulfur and poor nitrogen and phosphorus removal efficiency are present. The present disclosure can effectively shorten the time for the sulfur autuotrophic denitrification device tacking effect when used for treating mariculture tailwater.

The present disclosure can significantly enhance phosphorus removal efficiency. In a case that the phosphate concentration in mariculture tailwater fluctuates from 1-10 mg/L, with the HRT of 3-24 h, the effluent phosphate concentration approaches 0 mg/L, with a phosphate removal rate of 90% or more.

In the nitrogen removal functional zone of the present disclosure, in a case that the total nitrogen concentration in mariculture tailwater fluctuates from 10-40 mg/L, with the HRT of 3-24 h, sulfur autotrophic denitrification through sulfur transformation reduces the effluent concentration to 0-6.5 mg/L. The removal load can reach a maximum of 24.1 $gN \cdot m^{-2} \cdot d^{-1}$, achieving a total nitrogen removal rate of 90% or more.

In the present disclosure, when the sulfur autotrophic denitrification device is used for treating mariculture tailwater, the sulfur-reducing bacteria utilize the carbon sources slowly released from the agricultural waste to promote the conversion and utilization of elemental sulfur. The ratio of $SO_4^{2-}$-S in the effluent water to the removed total inorganic nitrogen (TIN) is 2.53 (close to the theoretical value of 2.51), and the utilization rate of elemental sulfur increases by 10% or more.

The present disclosure can employ the adsorption function of the modified biochar in the biochar zone and aeration in the effluent water microporous aeration zone to promote the adsorption of sulfide and the nitrification of ammonia nitrogen, preventing secondary pollutants such as ammonia nitrogen and sulfide in the effluent.

The present disclosure solves the problem of low biological nitrogen removal performance under seawater conditions, solves the problem of low biocompatibility when elemental sulfur is used as an electron donor for biological nitrogen removal, and solves the problem of low phosphorus removal performance in mariculture tailwater. The present disclosure overcomes the technical bias that, during using elemental sulfur as an electron donor for biological nitrogen removal, the biocompatibility is lower, and the biological nitrogen removal performance is lower under seawater conditions.

BRIEF DESCRIPTION OF THE DRAWINGS

The accompanying drawings are incorporated into and constitute a part of this specification, illustrating examples consistent with the present disclosure and serving to explain the principles of the present disclosure together with the specification.

Figure 1:
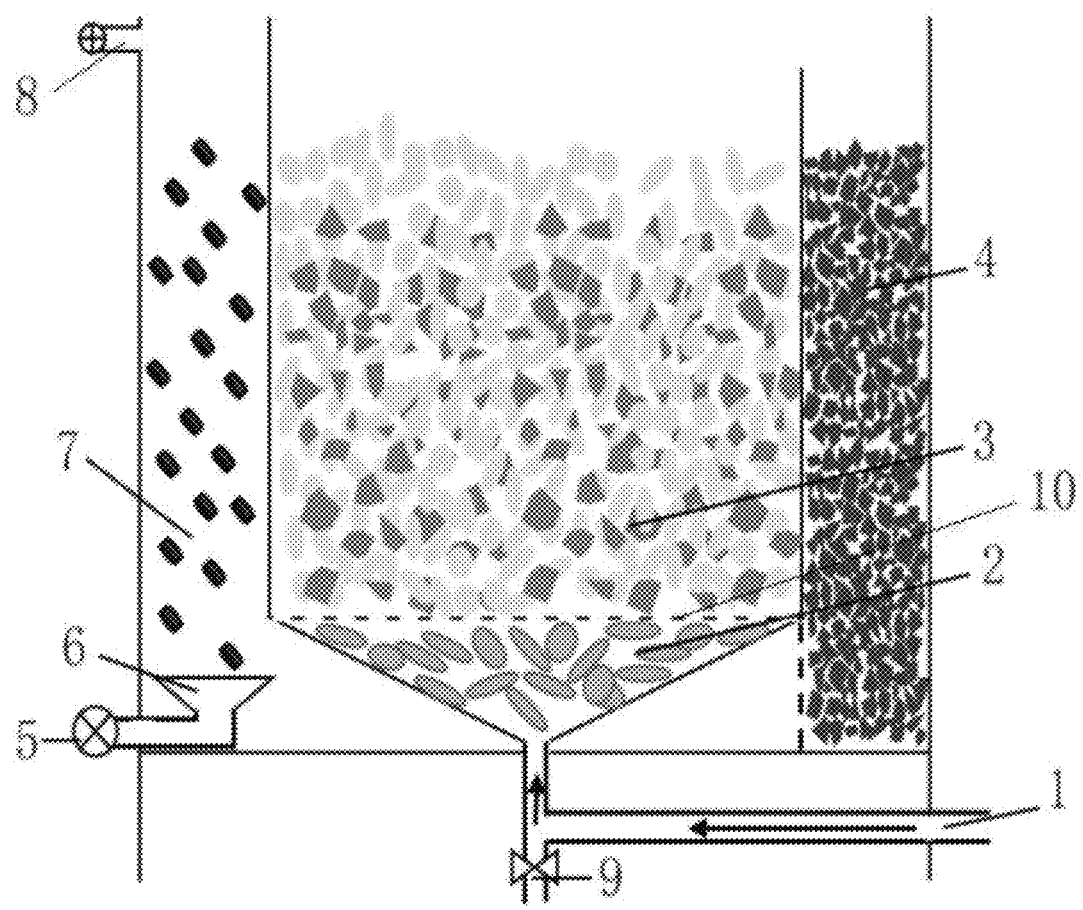
FIG. 1 is a schematic diagram of a device for efficiently treating nitrogen and phosphorus pollutants in mariculture wastewater according to an example of the present disclosure.

Reference numerals and denotations thereof: 1—water inlet pipe; 2—influent water distribution zone; 3—nitrogen removal functional zone; 4—secondarily modified biochar zone; 5—air pump; 6—microporous aeration disk; 7—effluent water microporous aeration zone; 8—water outlet; 9—sewage outlet; 10—perforated partition plate; and 11—water inlet.

DETAILED DESCRIPTION

For easy understanding the above objective, features and advantages of the present disclosure, the specific embodiment of the present disclosure is described in detail with reference to the accompanying drawings. Many specific details are illustrated in the description below, so as to fully understand the present disclosure. However, the present disclosure can be implemented in other ways different from those described herein. Similar improvement can be made by those skilled in the art without departing from the connotation of the specification, therefore, the present disclosure is not limited by the specific examples disclosed below.

The innovation of the present disclosure lies in that: the present disclosure combines the modified agricultural waste with the elemental sulfur particles. The enriched sulfur-reducing bacteria utilize the carbon source slowly released from the waste as an electron donor to reduce elemental sulfur to $S^{2-}$ or $S_n^{2-}$, which is more easily utilized by sulfur-oxidizing bacteria, achieving efficient sulfur conversion. This process provides electrons for the autotrophic denitrification of sulfur-oxidizing bacteria, effectively shortening the startup time of the sulfur autotrophic denitrification device and improving the utilization efficiency of elemental sulfur.

In the present disclosure, by secondary modification of biochar, secondarily modified biochar with high sulfide and phosphorus adsorption characteristics under seawater conditions is prepared.

Figure 2:
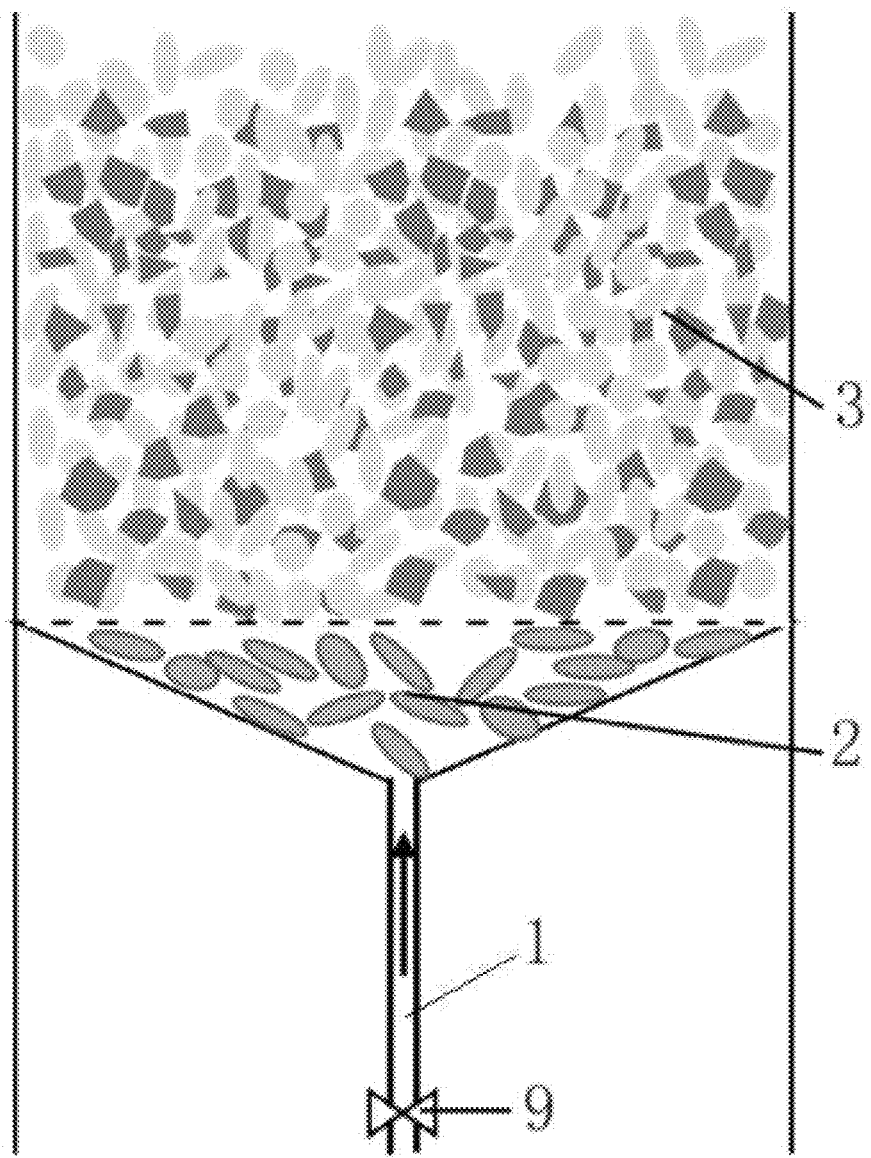
FIG. 2 is a schematic diagram of an influent water distribution zone and a nitrogen removal functional zone according to an example of the present disclosure.
Figure 3:
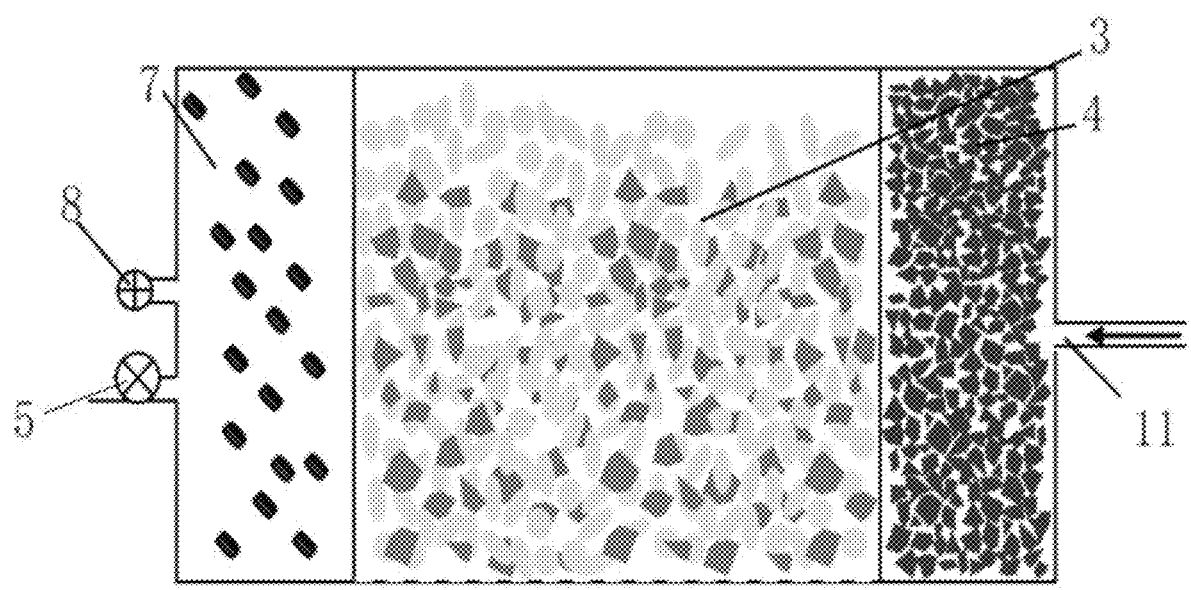
FIG. 3 is a schematic diagram of a secondarily modified biochar zone and an effluent water microporous aeration zone according to an example of the present disclosure.

Example 1, as shown in FIGS. 1-3, a device for efficiently treating nitrogen and phosphorus pollutants in mariculture wastewater provided by an example of the present disclosure includes: an influent water distribution zone 2, a nitrogen removal functional zone 3 based on efficient sulfur autotrophic denitrification through sulfur transformation, a secondarily modified biochar zone 4 with high sulfide and phosphorus adsorption capacity, and an effluent water microporous aeration zone 7.

The device for efficiently treating nitrogen and phosphorus pollutants in mariculture wastewater is cuboid, and includes an inner cavity and an outer cavity. The inner cavity is formed by the cone-shaped influent water distribution zone 2 and the cuboid nitrogen removal functional zone 3, which are separated into two parts by a perforated partition plate 10.

The outer cavity is formed by the rectangular secondarily modified biochar zone 4 and the effluent microporous aeration zone 7.

The influent water distribution zone 2 is arranged with cone-shaped and large-particle smooth fillers (such as cobbles and gravel), evenly mixed with water, enabling the mariculture tailwater to be uniformly dispersed within the device and enhancing treatment efficiency.

A bottom of the influent water distribution zone 2 is connected to a water inlet pipe 1.

A sewage outlet 9 is mounted on the other side of the water inlet pipe 1, for discharging sewage.

The nitrogen removal functional zone 3 based on efficient sulfur autotrophic denitrification through sulfur transformation includes elemental sulfur particles, modified agricultural waste, and enriched sulfur-reducing bacteria and sulfur-oxidizing bacteria (added at 10%-20% of the effective volume of the inner cavity). The sulfur-reducing bacteria utilize the carbon source slowly released from the modified agricultural waste to reduce the elemental sulfur particles into sulfide/polysulfide with stronger bioaffinity, providing electrons for the denitrification process of the sulfur-oxidizing bacteria and shortening the time for the reaction device to take effect.

In the secondarily modified biochar zone 4 with high sulfide and phosphorus adsorption capacity, by pyrolyzing alkali-modified agricultural waste at a temperature of 250-550° C., the biochar is prepared. The biochar is secondarily modified using $Fe^{3+}$, $Al^{3+}$, etc., for filling the secondarily modified biochar zone 4. This enhances the proportion of micropores and mesopores on the biochar surface and increases the content of functional groups, forming a modified biochar zone with high sulfide and phosphorus adsorption capabilities. The biochar is prepared by pyrolyzing the agricultural waste pre-processed under alkaline conditions (with 0.1 M-0.2 M NaOH solution) at a temperature of 250-550° C., followed by modification with metal ions such as $Fe^{3+}$ and $Al^{3+}$. Alkaline pretreatment disrupts the smooth structure on the surface of agricultural waste, increasing its pore structure and specific surface area. Metal oxide functional groups are formed on the surface of the biochar modified with metal ions such as $Fe^{3+}$ and $Al^{3+}$, enhancing its adsorption performance.

The effluent water microporous aeration zone 7 is arranged with a microporous aeration disk 6 at a water outlet 8, for further removing sulfide and ammonia nitrogen byproducts possibly present in tailwater after undergoing a nitrogen and phosphorus removal functional zone, minimizing the byproducts produced during mariculture tailwater treatment. The microporous aeration disk 6 is connected to an air pump 5.

The secondarily modified biochar zone 4 is connected to a water inlet 11.

Example 2, another objective of the present disclosure is to provide a method for efficiently treating nitrogen and phosphorus pollutants in mariculture wastewater, including the following content.

In the nitrogen removal functional zone 3, the modified agricultural waste is combined with elemental sulfur particles, the sulfur-reducing bacteria utilize the carbon source slowly released from the waste to reduce elemental sulfur to $S^{2-}$ or $S_n^{2-}$ utilized by sulfur-oxidizing bacteria, achieving sulfur transformation. At the same time, the sulfur-oxidizing bacteria reduce nitrate into nitrogen gas while utilizing $S^{2-}$ and $S_n^{2-}$ for sulfur oxidization, achieving nitrogen removal.

In the secondary modified biochar zone 4, biochar is secondarily modified to produce secondary modified biochar with high sulfide and phosphorus adsorption characteristics under seawater conditions, and aeration in the effluent water microporous aeration zone 7 is utilized to promote adsorption of sulfide and nitrification of ammonia nitrogen.

During phosphorus removal using secondarily modified biochar, in a case that a phosphate concentration in the mariculture tailwater fluctuates from 1-10 mg/L, with an HRT of 3-24 h, an effluent phosphate concentration is 0 mg/L.

In the nitrogen removal functional zone 3, in a case that a total nitrogen concentration in the mariculture tailwater fluctuates from 10-40 mg/L, with an HRT of 3-24 h, sulfur autotrophic denitrification is carried out through the sulfur transformation process, reducing an effluent concentration to 0-6.5 mg/L.

In the above examples, each example is described with particular emphasis. The relevant descriptions of other examples can be referred to for the part without detailed description or recording.

To further illustrate the effects related to the examples of the present disclosure, the following experiment is conducted.

Taking the treatment of aquaculture tailwater from a certain mariculture farm as an example, the tailwater enters a water distribution zone through an influent water pump, with an HRT of 3-24 h, a water temperature of around 20° C., a dissolved oxygen concentration in the nitrogen removal functional zone 3 of about 0.02 mg/L, a dissolved oxygen concentration in the aeration zone of about 3.0 mg/L, and an overall pH of the device around 7.5. The influent water has a nitrate content of 30 mg/L, a phosphate content of 7.0 mg/L, and a COD content of around 12.5 mg/L. The nitrogen and phosphorus removal performance of the continuous influent nitrogen and phosphorus removal device is shown in Table 1.

TABLE 1

Nitrogen and phosphorus removal performance of the continuous influent nitrogen and phosphorus removal device

| | $NO_3^-$-N (mg/L) | | | $PO_4^{3-}$-P (mg/L) | | |
| --- | --- | --- | --- | --- | --- | --- |
| HRT(h) | Influent water | Effluent water | Removal rate | Influent water | Effluent water | Removal rate |
| 3 | 30 | 5.1 | 83.0% | 7.0 | 0.1 | 98.6% |
| 6 | 30 | 2.0 | 93.3% | 7.0 | 0.1 | 98.6% |
| 12 | 30 | 1.1 | 96.3% | 7.0 | 0.1 | 98.6% |
| 24 | 30 | 0.4 | 98.7% | 7.0 | 0.1 | 98.6% |

The above mentioned is only the better embodiment rather than a limitation of the present disclosure. Within the technical scope disclosed by the present disclosure, any modifications, equivalent replacements or improvements, made by any skilled familiar to the prior art, within the spirit and scope of the present disclosure, fall within the scope of protection of the present disclosure.

The invention claimed is:

1. A device for treating nitrogen and phosphorus pollutants in mariculture wastewater, comprising an inner cavity and an outer cavity;
   the inner cavity comprising an influent water distribution zone (2) and a nitrogen removal functional zone (3) based on efficient sulfur autotrophic denitrification through sulfur transformation, the influent water distribution zone (2) and the nitrogen removal functional zone (3) being separated into upper and lower parts by a perforated partition plate (10), and
   the outer cavity comprising a secondarily modified biochar zone (4) and an effluent water microporous aeration zone (7), arranged on two sides of the nitrogen removal functional zone (3), respectively, wherein
   the nitrogen removal functional zone (3) comprises elemental sulfur particles, modified agricultural waste, and enriched sulfur-reducing bacteria and sulfur-oxidizing bacteria; the sulfur-reducing bacteria utilize carbon sources released from the modified agricultural waste to reduce the elemental sulfur particles into sulfide $S^{2-}$/polysulfide $S_n^{2-}$; and the sulfur-oxidizing bacteria reduce nitrate into nitrogen gas while utilizing the sulfide $S^{2-}$ and the polysulfide $S_n^{2-}$ for sulfur oxidation, achieving nitrogen removal;
   the secondarily modified biochar zone (4) is filled with secondarily modified biochar having sulfide and phosphorus adsorption capability; and the secondarily modified biochar is prepared by pyrolyzing alkali-modified agricultural waste at a temperature of 250° C.-550° C. to produce biochar, followed by secondary modification of the biochar with $Fe^{3+}$ and $Al^{3+}$; and
   the effluent water microporous aeration zone (7) is arranged with a microporous aeration disk (6) at a water outlet (8), for removing sulfide and ammonia nitrogen byproducts present in tailwater after passing through a nitrogen and phosphorus removal functional zone and for minimizing the byproducts produced during mariculture tailwater treatment, the microporous aeration disk (6) being connected to an air pump (5).

2. The device for treating nitrogen and phosphorus pollutants in mariculture wastewater according to claim 1, wherein the influent water distribution zone (2) is arranged with smooth filler materials formed by cone-shaped pebbles and gravel, for uniformly dispersing mariculture tailwater.

3. The device for treating nitrogen and phosphorus pollutants in mariculture wastewater according to claim 2, wherein a particle size of the pebbles and gravel is 5 cm-8 cm.

4. The device for treating nitrogen and phosphorus pollutants in mariculture wastewater according to claim 2, wherein a bottom of the influent water distribution zone (2) is connected to a water inlet pipe (1), and a sewage outlet (9) is mounted on a side, opposite to the bottom of the influent water distribution zone (2), of the water inlet pipe (1).

5. The device for treating nitrogen and phosphorus pollutants in mariculture wastewater according to claim 1, wherein the secondarily modified biochar zone (4) is connected to a water inlet (11).

6. A method for treating nitrogen and phosphorus pollutants in mariculture wastewater, the method using the device for treating nitrogen and phosphorus pollutants in mariculture wastewater according to claim 1, comprising:
   in the nitrogen removal functional zone (3), combining the modified agricultural waste with the elemental sulfur particles; utilizing, by the sulfur-reducing bacteria, the carbon sources released from the waste to reduce elemental sulfur to $S^{2-}$ or $S_n^{2-}$ utilized by the sulfur-oxidizing bacteria, achieving sulfur transformation; and converting, by the sulfur-oxidizing bacteria, nitrate into nitrogen gas at the same time, achieving nitrogen removal; and
   in the secondarily modified biochar zone (4), preparing secondarily modified biochar with sulfide and phosphorus adsorption characteristics under seawater conditions by secondary modification of biochar, and utilizing aeration in the effluent water microporous aeration zone (7) to promote adsorption of sulfide and nitrification of ammonia nitrogen.

7. A method for treating nitrogen and phosphorus pollutants in mariculture wastewater, applied to the device for treating nitrogen and phosphorus pollutants in mariculture wastewater according to claim 2, comprising:
   in the nitrogen removal functional zone (3), combining the modified agricultural waste with the elemental sulfur particles; utilizing, by the sulfur-reducing bacteria, the carbon sources released from the waste to reduce elemental sulfur to $S^{2-}$ or $S_n^{2-}$ utilized by the sulfur-oxidizing bacteria, achieving sulfur transformation; and converting, by the sulfur-oxidizing bacteria, nitrate into nitrogen gas at the same time, achieving nitrogen removal; and
   in the secondarily modified biochar zone (4), preparing secondarily modified biochar with sulfide and phosphorus adsorption characteristics under seawater conditions by secondary modification of biochar, and utilizing aeration in the effluent water microporous aeration zone (7) to promote adsorption of sulfide and nitrification of ammonia nitrogen.

8. A method for treating nitrogen and phosphorus pollutants in mariculture wastewater, applied to the device for treating nitrogen and phosphorus pollutants in mariculture wastewater according to claim 3, comprising:
   in the nitrogen removal functional zone (3), combining the modified agricultural waste with the elemental sulfur particles; utilizing, by the sulfur-reducing bacteria, the carbon sources released from the waste to reduce elemental sulfur to $S^{2-}$ or $S_n^{2-}$ utilized by the sulfur-oxidizing bacteria, achieving sulfur transformation; and converting, by the sulfur-oxidizing bacteria, nitrate into nitrogen gas at the same time, achieving nitrogen removal; and
   in the secondarily modified biochar zone (4), preparing secondarily modified biochar with sulfide and phosphorus adsorption characteristics under seawater conditions by secondary modification of biochar, and utilizing aeration in the effluent water microporous aeration zone (7) to promote adsorption of sulfide and nitrification of ammonia nitrogen.

9. A method for treating nitrogen and phosphorus pollutants in mariculture wastewater, applied to the device for treating nitrogen and phosphorus pollutants in mariculture wastewater according to claim 4, comprising:
   in the nitrogen removal functional zone (3), combining the modified agricultural waste with the elemental sulfur particles; utilizing, by the sulfur-reducing bacteria, the carbon sources released from the waste to reduce elemental sulfur to $S^{2-}$ or $S_n^{2-}$ utilized by the sulfur-oxidizing bacteria, achieving sulfur transformation; and converting, by the sulfur-oxidizing bacteria, nitrate into nitrogen gas at the same time, achieving nitrogen removal; and in the secondarily modified biochar zone (4), preparing secondarily modified biochar with sulfide and phosphorus adsorption characteristics under seawater conditions by secondary modification of biochar, and utilizing aeration in the effluent water microporous aeration zone (7) to promote adsorption of sulfide and nitrification of ammonia nitrogen.

10. A method for treating nitrogen and phosphorus pollutants in mariculture wastewater, applied to the device for treating nitrogen and phosphorus pollutants in mariculture wastewater according to claim 5, comprising:

in the nitrogen removal functional zone (3), combining the modified agricultural waste with the elemental sulfur particles; utilizing, by the sulfur-reducing bacteria, the carbon sources released from the waste to reduce elemental sulfur to $S^{2-}$ or $S_n^{2-}$ utilized by the sulfur-oxidizing bacteria, achieving sulfur transformation; and converting, by the sulfur-oxidizing bacteria, nitrate into nitrogen gas at the same time, achieving nitrogen removal; and in the secondarily modified biochar zone (4), preparing secondarily modified biochar with sulfide and phosphorus adsorption characteristics under seawater conditions by secondary modification of biochar, and utilizing aeration in the effluent water microporous aeration zone (7) to promote adsorption of sulfide and nitrification of ammonia nitrogen.

11. The method for treating nitrogen and phosphorus pollutants in mariculture wastewater according to claim 6, wherein during phosphorus removal using the secondarily modified biochar, in a case that a phosphate concentration in the mariculture tailwater fluctuates from 1-10 mg/L, with a hydraulic retention time (HRT) of 3-24 h, an effluent phosphate concentration is 0 mg/L.

12. The method for treating nitrogen and phosphorus pollutants in mariculture wastewater according to claim 6, wherein in the nitrogen removal functional zone (3), in a case that a total nitrogen concentration in the mariculture tailwater fluctuates from 10-40 mg/L, with an HRT of 3-24 h, sulfur autotrophic denitrification is carried out through the sulfur transformation process, reducing an effluent concentration to 0-6.5 mg/L.

* * * * *